(12) United States Patent
Dubosc (10) Patent No.: US 9,772,085 B2
(45) Date of Patent: Sep. 26, 2017

(54) MOTOR VEHICLE OPTICAL SYSTEM HAVING A PLURALITY OF CONTROLLED LIGHT EMISSION SUBSYSTEMS AND LIGHT GUIDE THAT COOPERATE TO PROVIDE AT LEAST ONE PREDETERMED LIGHTING FUNCTION

(71) Applicant: Valeo Vision, Bobigny (FR)

(72) Inventor: Christophe Dubosc, Villemomble (FR)

(73) Assignee: Valeo Vision, Bobigny (FR)

( * ) Notice: Subject to any disclaimer, the term of this patent is extended or adjusted under 35 U.S.C. 154(b) by 38 days.

(21) Appl. No.: 14/869,236

(22) Filed: Sep. 29, 2015

(65) Prior Publication Data

US 2016/0091162 A1    Mar. 31, 2016

(30) Foreign Application Priority Data

Sep. 30, 2014 (FR) ..................... 14 59267

(51) Int. Cl.
*F21S 8/10*    (2006.01)
*F21V 5/02*    (2006.01)
(Continued)

(52) U.S. Cl.
CPC ........ *F21S 48/2281* (2013.01); *B60Q 1/0058* (2013.01); *B60Q 1/2607* (2013.01); *B60Q 1/28* (2013.01); *B60Q 1/38* (2013.01); *F21S 48/215* (2013.01); *F21S 48/218* (2013.01); *F21S 48/2237* (2013.01); *F21S 48/2268* (2013.01); *F21V 5/02* (2013.01); *F21V 23/0407* (2013.01); *G02B 6/0005* (2013.01); *B60Q 2400/20* (2013.01); *B60Q 2400/30* (2013.01);
(Continued)

(58) Field of Classification Search
CPC .... F21S 48/1241; F21S 48/215; F21S 48/218; F21S 48/22; F21S 48/2206; F21S 48/2212; F21S 48/2218; F21S 48/2225; F21S 48/2231; F21S 48/2237; F21S 48/2243; F21S 48/225; F21S 48/2256; F21S 48/2262; F21S 48/2268; F21S 48/2275; F21S 48/2281; F21S 48/2287; F21S 48/2293
USPC .......................................... 362/511
See application file for complete search history.

(56) References Cited

U.S. PATENT DOCUMENTS

| 6,164,799 | A  | * | 12/2000 | Hirmer ............... | F21S 48/1241 362/327 |
| 6,508,576 | B2 |   | 1/2003  | Emmelmann et al. | |
| 6,752,522 | B2 | * | 6/2004  | Pinson ................ | F21S 48/1154 362/307 |
| 6,769,798 | B2 | * | 8/2004  | Mishimagi .......... | B60Q 1/2665 362/494 |
| 6,880,960 | B2 | * | 4/2005  | Mishimagi ............ | B60R 1/1207 362/494 |
| 7,086,765 | B2 | * | 8/2006  | Wehner ................ | B60Q 1/0041 362/240 |
| 9,039,260 | B2 |   | 5/2015  | Faffelberger | |
| 9,242,594 | B2 | * | 1/2016  | Nakada ................. | G02B 6/002 |
| 2001/0048601 | A1 |   | 12/2001 | Emmelmann et al. | |

(Continued)

FOREIGN PATENT DOCUMENTS

| DE | 10022420 A1 | 11/2001 |
| DE | 10207694 A1 | 11/2003 |

(Continued)

*Primary Examiner* — Robert May
(74) *Attorney, Agent, or Firm* — Jacox, Meckstroth & Jenkins (57) ABSTRACT

An optical light emission system for a motor vehicle, the optical system comprising:
  a first light emission subsystem comprising a first set of light sources, and
  a second light emission subsystem comprising a second set of light sources and a light guide able to diffuse the light from said light sources of the second set of light sources outside the optical system.
The light guide is arranged facing the first set of light sources such that the first set of light sources substantially radiates through the light guide outside the optical system.

22 Claims, 3 Drawing Sheets

(51) Int. Cl.

|  |  |
|---|---|
| *F21V 23/04* | (2006.01) |
| *B60Q 1/00* | (2006.01) |
| *B60Q 1/26* | (2006.01) |
| *B60Q 1/28* | (2006.01) |
| *B60Q 1/38* | (2006.01) |
| *F21V 8/00* | (2006.01) |
| *F21W 101/12* | (2006.01) |
| *F21Y 105/10* | (2016.01) |
| *F21Y 103/10* | (2016.01) |
| *F21Y 115/10* | (2016.01) |
| *F21Y 113/13* | (2016.01) |

(52) U.S. Cl.
CPC ...... *F21W 2101/12* (2013.01); *F21Y 2103/10* (2016.08); *F21Y 2105/10* (2016.08); *F21Y 2113/13* (2016.08); *F21Y 2115/10* (2016.08)

(56) References Cited

U.S. PATENT DOCUMENTS

| | | |
|---|---|---|
| 2013/0114277 A1 | 5/2013 | Faffelberger |
| 2013/0127340 A1 | 5/2013 | Huhn et al. |
| 2015/0330593 A1 | 11/2015 | Larson et al. |

FOREIGN PATENT DOCUMENTS

| | | |
|---|---|---|
| DE | 202010004777 U1 | 9/2011 |
| EP | 2592333 A2 | 5/2013 |
| EP | 2596992 A2 | 5/2013 |
| JP | 2008147032 A | 6/2008 |
| WO | 2014105470 A1 | 7/2014 |

\* cited by examiner

MOTOR VEHICLE OPTICAL SYSTEM HAVING A PLURALITY OF CONTROLLED LIGHT EMISSION SUBSYSTEMS AND LIGHT GUIDE THAT COOPERATE TO PROVIDE AT LEAST ONE PREDETERMED LIGHTING FUNCTION

CROSS-REFERENCE TO RELATED APPLICATIONS

This application claims priority to the French application 1459267 filed on Sep. 30, 2014, which application is incorporated herein by reference and made a part hereof.

BACKGROUND OF THE INVENTION

1. Field of the Invention

The invention concerns an optical light emission system for a vehicle.

2. Description of the Related Art

Lighting systems fitted to vehicles are for example used to improve the visibility of the vehicle environment, to indicate the presence of the vehicle to other road users, to indicate that the vehicle is braking, or to indicate an intention to change the direction of movement of the vehicle.

In modern systems used more particularly for the latter function, it is normal for the light source used to create the light beam, visible to people in the environment, to take the form of a plurality of light sources.

This type of configuration has a significant drawback: the light output obtained from this plurality of sources in turn presents a number of light shadows, each corresponding to a beam emitted by one of the light sources, which is not desirable.

Also certain standards require that the flashing of the systems follows a so-called "tracer" function which consists of a sequential illumination of a plurality of light sources during a predefined time lapse.

Observation of this constraint by the known systems makes it difficult to obtain a continuously illuminated appearance of the latter.

SUMMARY OF THE INVENTION

The invention therefore aims to improve the situation.

To this end, the invention concerns an optical light emission system for a motor vehicle, the optical system comprising:

a first light emission subsystem comprising a first set of light sources configured to emit light, and a second light emission subsystem comprising a second set of light sources configured to emit light and a light guide able to diffuse the light from the light sources of the second set of light sources outside the optical system.

In particular, the light guide is arranged facing the first set of light sources such that the first set of light sources radiates substantially through the light guide outside the optical system.

The passage of light beams emitted by the sources of the first set has the effect of mixing and homogenizing the light emitted by the different light sources of the device for a wide range of observation angles of the system according to the invention. The configuration of the sources, in particular their possible spot-like nature, spatial arrangement etc., is not or is scarcely perceptible when viewing the global light output of the system. This output is therefore improved accordingly.

Advantageously, the light guide has two longitudinal end faces separated by at least one peripheral face. Where applicable, the one of the longitudinal end faces forms a light entry face associated with the second set of light sources, this light propagating by total internal reflection in the light guide up to a light outlet face arranged on the peripheral face. In particular, the light guide may be a light guide of the generally cylindrical type.

Advantageously, the first set of light sources extends facing the light guide substantially along the peripheral face of the guide, from a side of the guide opposite the outlet face, the second set of light sources being arranged at the light entry face. It is understood that according to the invention, the light emitted by the first set of light sources passes transversely through the guide, i.e. entering the guide via a side of the peripheral face opposite the outlet face and leaving via the outlet face. Thanks to the invention, this outlet face is an outlet face for both the light from the first set of light sources and for that of the second set. If desired, a closing lens may be arranged in front of the outlet face of the guide.

Advantageously, the second subsystem is arranged such that when the light sources of the second set emit light, the beam emitted via the outlet face of the guide performs a legally required function of direction indication. Where applicable, the second set of light sources comprises one or more light sources able to emit amber-colored light.

According to another aspect of the invention, the first subsystem is adapted to perform a subfunction of the direction indication function, the subfunction being known as a tracer function and consisting of sequential illumination of a plurality of light sources taking place over an interval of predefined duration. Where applicable, the second set of light sources comprises one or more light sources able to emit amber-colored light.

According to another aspect of the invention, the light guide comprises diversion means configured to modify the direction of propagation of the light emitted by the second set of light sources which propagates along the light guide.

In this way, the relative arrangement of the light guide and the first set of light sources is not a restrictive factor for the desired radiation from the second set of light sources.

In a particular embodiment, the first set of light sources is configured to emit light in a main emission direction, the diversion means being configured to re-orient the light emitted by the second set of light sources which propagates along the light guide substantially in the main emission direction. This in particular allows an improved homogeneity in the main emission direction.

In one embodiment, the diversion means comprise diversion prisms, formed for example in the thickness of the light guide or on a surface of the light guide. This light diversion function is thus achieved easily without affecting the light emitted from the first set of light sources.

According to another embodiment of the invention, the system comprises a housing delimiting an open cavity, the housing comprising a portion on which the first set of light sources is arranged such that the first set of light sources is situated facing an opening of the cavity. Where applicable, the internal walls of the housing may be diffusing, for example by being coated with a diffusing white paint.

In a particular embodiment, the system also comprises a closing diffusing lens sealing the cavity. For example, the closing lens may be translucent.

As a variant, the system may comprise diffusion means such as collimators or reflectors of the light emitted by the first set of light sources towards the light guide.

According to another aspect of the invention the system also comprises at least one light source offset relative to the light guide such that the or each the light source does not radiate substantially through the light guide.

This allows the arrangement of light sources allowing personalization of the global light output of the system.

In a particular embodiment, the system also comprises a control device for the first and second sets of light sources.

According to another aspect of the invention, the control device is adapted to control the first and second sets of light sources in a first sequence in which all or some of the light sources of the first set are illuminated sequentially in a first predefined order of illumination and then extinguished, in particular simultaneously, and all or some of the light sources of the second set are illuminated in response to the extinction, in particular the simultaneous extinction, of the light sources of the first set.

This allows provision of an emission mode of the light sources with optimum homogenization.

In one embodiment, the control device is adapted to control the first and second sets of light sources in a second sequence in which:
  all or some of the light sources of the first set are illuminated sequentially in a second predefined order of illumination,
  the light power emitted by all or some of the light sources of the first set is reduced after the illumination of the light sources of the first set, in the second order of illumination, and
  all or some of the light sources of the second set are illuminated after the illumination of the light sources of the first set, in the second order of illumination.

This allows provision of an emission mode with a high light power and excellent homogeneity.

According to another aspect of the invention, the control device is adapted to control the first and second sets of light sources in a third sequence in which:
  all or some of the light sources of the first set are illuminated sequentially in a third predefined order of illumination,
  all or some of the light sources of the second set are illuminated after the illumination of the light sources of the first set, in the third order of illumination.

This allows provision of an emission mode of increased light power.

According to one aspect of the invention, the second set of light sources of the second subsystem comprises one or more light sources able to emit white-colored light.

If desirable, all light sources of the second set are arranged on the same support, for example on a printed circuit board. For example, these may be semiconductor photo-emission elements adapted to generate light rays by photoluminescence. These elements may each be formed by an light-emitting diode. As a variant, the elements may each be formed by a chip of the same so-called multichip light-emitting diode.

In a particular embodiment, the system has a first operating mode in which the optical system performs the function of a flashing light, and a second operating mode of daytime running lighting in which one or more of the light sources of the second set of light sources able to emit white-colored light are illuminated.

In the second operating mode, one or more of the light sources of the second set of light sources able to emit white-colored light are illuminated to emit a beam with a first light intensity, for example when supplied with a first electrical power, the light emission system also comprising a third operating mode of position lighting in which one or more of the light sources of the second set of light sources able to emit white-colored light are illuminated to emit a beam with a second light intensity lower than the first light intensity, for example when supplied with a second electrical power lower than the first electrical power.

The invention will be better understood from reading the detailed description below given merely as an example with reference to the attached drawings on which:

DETAILED DESCRIPTION OF THE PREFERRED EMBODIMENTS

Figure 1:
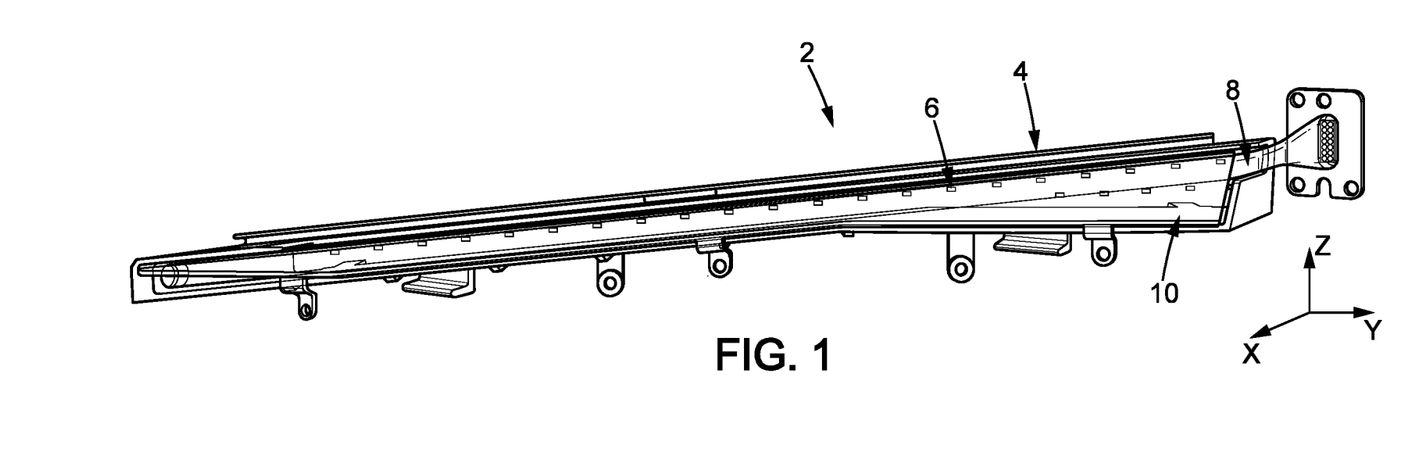
FIGS. 1 to 3 are front views of an optical system according to the invention.

FIG. 1 illustrates an optical light emission system 2 according to the invention, referred to below as the system 2. FIG. 1 has a reference system of a trihedral XYZ.

The system 2 is intended to be fitted to a motor vehicle. The system 2 is configured to perform a function of external lighting of the vehicle. In particular, the system 2 has:
  a first operating mode of flashing lighting. This first operating mode is implemented for example to indicate a change of direction of the vehicle or to indicate a hazard situation;
  a second operating mode of daytime running lighting; and
  a third operating mode of position lighting.

These operating modes are explained below.

In practice, the system 2 is preferably a system commonly known as a "flasher" and which may serve to indicate that the vehicle is intending to change direction, to help indicate a hazard situation, to perform position lighting etc.

The system 2 is for example arranged at the front or rear of the vehicle and is in contact with the external environment.

The system 2 is configured to emit a light beam in a main emission direction corresponding to axis X of the trihedral XYZ. In a configuration wherein the system 2 is integrated in a vehicle, this direction X is oriented away from the vehicle.

The system 2 comprises a housing 4, a first light emission subsystem 6, a second subsystem 8 and a closing lens 10.

Figure 2:
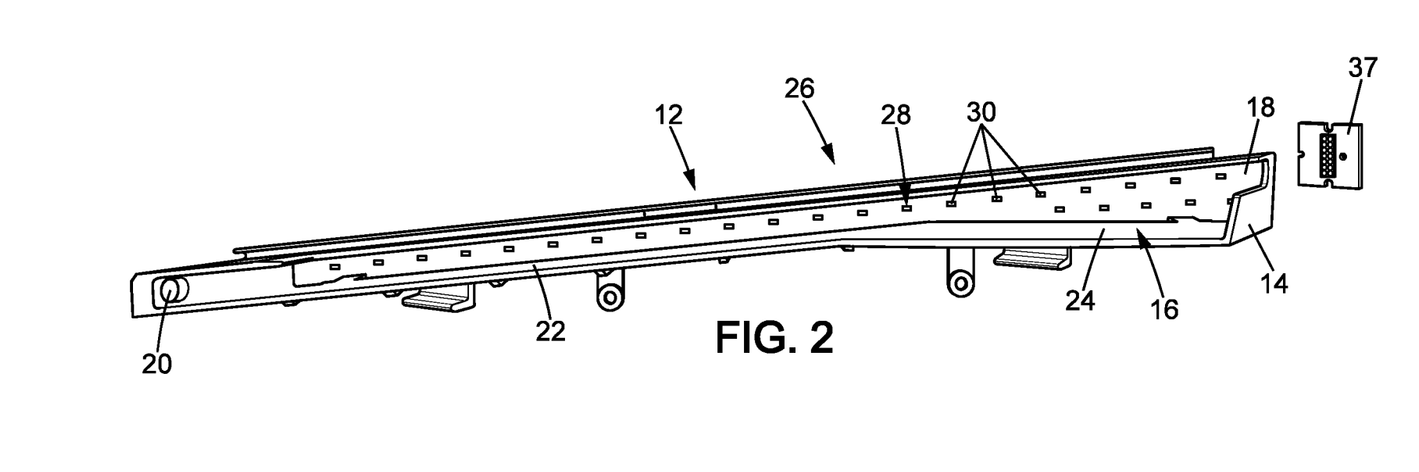

With reference to FIG. 2, the housing 4 comprises a rear portion 12, a side portion or wall 14 and a floor 16.

The rear portion 12 is substantially vertical (in the orientation direction of FIG. 2) and on its inner face delimits an elongated horizontal groove over which sits a lip. The side portion 14 is terminated at one of its ends by the side portion 14 and has a passage opening 18 at its other end.

The side portion 14 is substantially vertical and takes the form of a wall provided with a recess 20. As described below, the passage opening 18 and the recess 20 allow passage of an element of the second subsystem 8 as described below.

The floor 16 delimits a lip 22 edging the rear portion 12 over part of its length and delimits a protrusion 24 next to the side wall 14.

The housing 4 delimits a cavity 26 open at the front and the top. As illustrated on FIG. 1, this cavity 26 is intended to be sealed by the closing lens 10.

Preferably, the inner faces of the elements of the housing 4 are reflective, which maximizes the light power emitted by the system 2. As a variant, the inner walls of the housing 4 are diffusing. To this end, they are for example coated with a diffusing white paint.

The first subsystem 6 is in particular adapted to perform a subfunction of flashing light, this first subsystem 6 being known as a tracer function. This function consists of sequential illumination of a plurality of light sources taking place over an interval of predefined duration. This duration is for example prescribed by a standard.

Still with reference to FIG. 2, the first subsystem 6 comprises a set 28 of light sources 30, referred to below as the first set 28. The light sources 30 are arranged on the inner face of the rear portion 12 of the housing 4. The light sources 30 are thus arranged facing the front opening of the cavity 26. The light sources 30 have a main emission direction corresponding substantially to the emission direction X of the system 2.

Preferably, the light sources 30 are arranged on the rear portion 12 in a matrix arrangement, i.e. in rows and columns. Preferably the rows of the arrangement of light sources 30 are substantially horizontal, and the columns are substantially vertical (in the direction of orientation of FIGS. 1 to 3). This arrangement in particular fulfils certain requirements imposed by standards in relation to flashing lighting.

Figure 3:
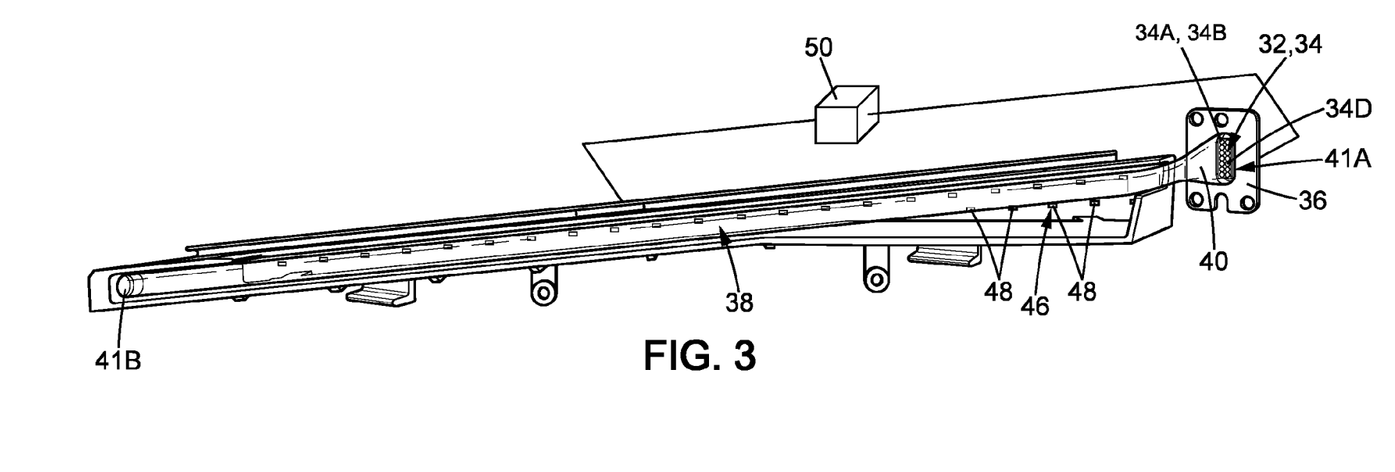

In the example of FIGS. 1 to 3, the arrangement of the light sources 30 of the first set 28 comprises a single row. Also, the distance separating two consecutive light sources 30 is between 10 mm and 30 mm, and for example approximately equal to 20 mm.

Preferably, the light sources 30 are substantially spot-like. For example, the light sources 30 are semiconductor photo-emission elements able to generate light rays by photoluminescence, such as light-emitting diodes.

Also, the light sources 30 are adapted to emit light beams of amber or white color.

The second subsystem 8 is adapted to implement the flashing light function associated with the first subsystem 6, and to homogenize the light emitted by the system 2 in general.

With reference to FIG. 3, the second subsystem 8 comprises a second set 32 of light sources 34 and a light guide 36.

The second set 32 of light sources 34 is situated outside the housing 4. For example, these light sources 34 are fixed to a wall of the vehicle close to system 2.

For example, the light sources 34 are semiconductor photo-emission elements able to generate light rays by photoluminescence such as light-emitting diodes. Also for example, the light sources 34 are all arranged on the same support, for example a printed circuit board 36. In the embodiments as shown in FIG. 3, the light sources 34 of the second set 32 are grouped on the same printed circuit board 37 (FIG. 2). The printed circuit board 36 is situated outside the housing 4 and is for example fixed to a wall of the vehicle in which the system 2 is integrated.

Also, the light sources 34 may each be produced by a light-emitting diode. As a variant, the light sources 34 may each be formed by a chip of the same so-called multichip light-emitting diode.

The second subsystem 8 is adapted to perform a legally required function of direction indication. This function is for example implemented during the first operating mode of the system 2.

To this end, the light sources 34 comprise at least one light source 34A adapted to emit amber-colored light. Also, the second subsystem 8 is adapted to perform a function of daytime running lighting. This function is implemented during the second operating mode system 2.

To this end, the light sources 34 comprise at least one light source adapted to emit a light white-colored light beam. On implementation of this function, at least one of the white-colored light sources 34B is illuminated.

The light sources 34 of the second set 32 have an arbitrary orientation in relation to the emission direction X. In practice, this orientation depends on the orientation of the wall on which these light sources 34 are arranged.

The light guide 36 is produced from a material with good light guidance properties. For example, the light guide 36 is made of polymethyl methacrylate (PMMA) or polycarbonate (PC).

The light guide 36 is configured to guide the light emitted by the second set 32 of light sources 34, and homogenize the light emitted by the system 2.

Still with reference to FIG. 3, the light guide 36 has a main portion 38 and a connection portion 40 flanked on either side by one of the two longitudinal ends 41A, 41B.

The main portion 38 has a generally cylindrical form. The main portion 38 is received at one of its ends in the passage opening 18 of the side wall or rear portion 12 of the housing 4, and at its other end in the recess 20 of the rear portion 12. The main portion 38 extends facing and close to the light sources 30 of the first set 28, such that the light sources 30 of the first set 28 radiate substantially through the main portion 38 of the light guide 36. By "substantially" here, we mean that the majority of the light beams emitted by the light sources 30 pass through the light guide 36. Only a small part of the beams, for example certain beams emitted with a high angle of elevation relative to the emission direction X, are liable to leave the system 2 without passing through the light guide 36. In practice, at least the part of the main portion 38 facing the first set 28 of light sources 30 extends along axis Y.

This passage of the light beams emitted by the first subsystem 6 through the light guide 36 has the effect of mixing and homogenizing the light emitted by the two subsystems 6 and 8. Thus the configuration of the light sources 30, 34 is "glued", such that the configuration of the light sources 30, 34, i.e. their spot-like nature, relative spacing etc., is less or not visible after passage of the light beams through and along the light guide 36.

The main portion 38 (FIGS. 4A and 4B) has an outer portion 38S forming a peripheral face of the light guide 36. This peripheral face or outer portion 38S has a light outlet face 38E corresponding to the face of the light guide 36 through which the light from the first and second sets 28, 32 is emitted. The main portion 38 also comprises a face 38O opposite the light outlet face 38E. This face 38O is oriented in the direction of the rear portion 12 of the housing 4 and the light sources 30 of the first set 28.

The connection portion 40 is connected firstly to the main portion 38 and secondly to the second set 32 of light sources 34. Thus the light beams emitted by the light source 34 penetrate the light guide 36 and propagate along the main portion 38.

The longitudinal end 41A situated at the side of the connection portion 40 forms an entry face for the light into the light guide 36. This entry face thus allows entry of the light emitted by the second set 32 of light sources 34 into the light guide 36.

Figure 4A:
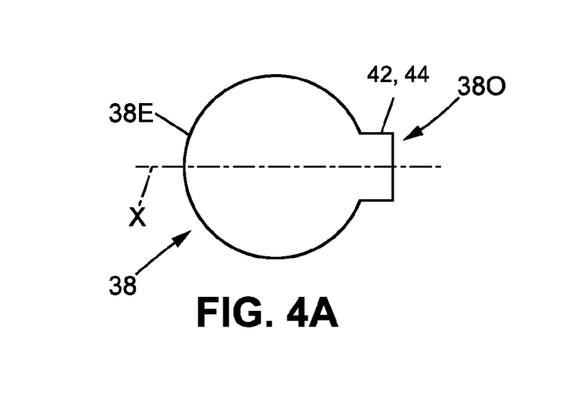
FIGS. 4A and 4B are illustrations of a cross-section and longitudinal section respectively of a light guide of the optical system of FIGS. 2 and 3.
Figure 4B:
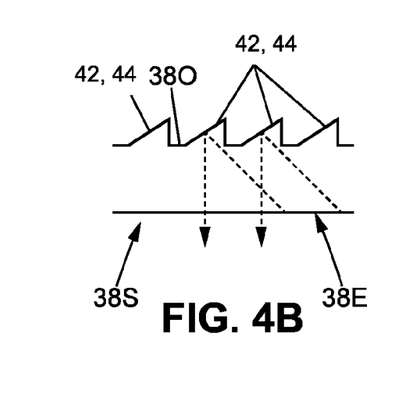

With reference to FIGS. 4A and 4B, which illustrate a cross-section and longitudinal section respectively of the main portion 38 of the light guide 36, the light guide 36 comprises diversion means 42 configured to modify the propagation direction of the light beams which propagate in the light guide 36. More particularly, the diversion means 42 are configured to re-orient the light beams propagating in the light guide 36 substantially in the emission direction X of the system 2.

For example, the diversion means 42 take the form of diversion prisms 44 arranged on the face 38O opposite the outlet face 38E. The diversion prisms 44 protrude in the direction of the light sources 30 of the first set 28.

As a variant, the diversion prisms 44 are arranged in the thickness of the light guide 36 and have a form and position adapted to re-orient the direction of the light beams in direction X.

Preferably, the diversion means 42 are also configured not to modify or to only slightly modify the propagation direction of the light beams emitted by the light sources 30 of the first set 28 on their passage through the light guide 36. Therefore the light guide 36 only slightly disrupts the light emission from the first set 28.

The closing lens 10 is produced from a transparent material. For example, the closing lens 10 is made from polycarbonate or polymethyl methacrylate. For example, the closing lens 10 is colorless.

In certain embodiments, the closing lens 10 is also configured to diffuse the light.

The closing lens 10 is configured not to modify the properties of the light beams passing through it. Alternatively, the closing lens 10 is configured to further improve the homogeneity of the light beams emitted by the system 2. For example, to this end the closing lens 10 has optical prisms on at least one of its faces, for example the inner face, or a graining.

As indicated above, the closing lens 10 is configured to seal the cavity 26 delimited by the housing 4. To this end, the closing lens 10 has an upper portion, the shape of which is similar to the shape of the floor 16 of the housing 4, and a substantially vertical front portion. Also, the closing lens 10 is fixed to the housing 4. This fixing is achieved for example by welding or by gluing.

With reference to FIG. 3, preferably the system 2 also comprises a third set 46 of light sources 48 adapted to emit light outside the system 2.

The light sources 48 of this third set 46 are offset relative to the light guide 36 such that they do not substantially radiate through the light guide 36. In other words, the majority of the light beams emitted by the light sources 48 do not pass through the light guide 36.

For example, the light sources 48 are arranged on the rear portion 12 close to the side wall 14, for example on a line vertically offset relative to the light guide 36.

These light sources 48 allow the generation of a resulting non-homogenized light beam which is superposed over the beams resulting from the first and second subsystems 6 and 8. This allows personalization of the global visual output of the system 2. The arrangement of the light sources 48 relative to each other and relative to the light guide 36 is selected as a function of the desired light output.

Still with reference to FIG. 3, the system 2 also comprises a control device or module 50.

The control device 50 is connected to the first, second and third sets 28, 32, 46, and is configured to control the different light sources 30, 34, 48, in particular their illumination, their extinction and the light power they emit.

In particular, the control device 50 is configured to select the implementation of the first operating mode, in which the flashing light function is implemented via the light emission of the first subsystem 6 and the second subsystem 8, the second operating mode of daytime running lighting in which one or more of the light sources 34 of the second set 32 adapted to emit a white light beam are illuminated, and the third operating mode in which one or more of the light sources 34B able to emit white-colored light are illuminated but radiate with a lower power than that used in the second operating mode.

Also, the control device 50 is adapted to control the first and second sets 28, 32 in a first sequence S1 during which all or some of the light sources 30 of the first set 28 are illuminated sequentially in a first predefined order of illumination and then extinguished, for example simultaneously, and all or some of the light sources 34 of the second set 32 are illuminated in response to the extinction of the light sources 30 of the first set 28.

This sequence S1 is preferably implemented in the first operating mode of the system 2 for the flashing light.

The first predefined order of illumination corresponds for example to a sequential illumination of the different light sources 30 of the first set 28, starting from an end light source 30 or an end column of light sources and passing through the light sources 30 or columns of light sources 30 in the direction towards the other end. For example, the end at which the illumination begins corresponds to the inner end of the system 2 in the direction of its arrangement in the vehicle. For example, in the case where the side wall 14 is oriented towards the center axis of the vehicle, the first light source 30 illuminated will be that which is closest to the side wall 14, and conversely on the passage side in the opposite case.

For example, in the first order of illumination, the light sources 30 are illuminated in a few tenths of a second, for example two tenths of a second.

The sequence S1 is for example followed by a delay of around 0.33 second during which the system 2 does not emit light, after which this sequence S1 is repeated. In practice, the sequence S1 is designed to meet the requirements imposed by standards relating to flashing lights for vehicles intended for road traffic. Some of these standards in particular require the initial illumination to take place over a duration corresponding substantially to 0.2 s, and that the illuminated phase (including therefore the initial illumination) lasts around 0.33 s, after which an extinction phase of a duration of around 0.33 s must be observed.

As well as observing these standards, the effect of this sequence S1 is that the system 2 emits a resulting light beam with excellent visual homogeneity when operating as a flasher.

Also, the control device 50 is adapted to control the first and second sets 28, 32 of light sources 30, 34 in a second sequence S2 during which:

all or some of the light sources 30 of the first set 28 are illuminated sequentially in a second predefined order of illumination, the light power emitted by all or some of the light sources 30 of the first set 28 is reduced after the illumination of the light sources 30 of the first set 28, in the second order of illumination, and all or some of the light sources 34 of the second set 32 are illuminated after the illumination of the light sources 30 of the first set 28, in the second order of illumination.

It is noted that the reduction in light power emitted by the light sources 30 is obtained for example by the device 50 controlling a reduction in the electrical power supplied to the light sources 30.

In certain embodiments, the second order of illumination corresponds to the first order of illumination.

In a manner similar to the first sequence S1, for example, the second sequence S2 lasts approximately 0.33 s and is followed by a delay of a duration of approximately 0.33 s during which the system 2 does not emit light, after which this sequence S2 is repeated or sequence S1 is performed, then where applicable repeated or alternating with the second sequence S2.

The effect of this second sequence S2 is also to give an excellent visual homogeneity of the system 2 when implemented, in addition to leading to a greater light power because at least one of the light sources 30 of the first set 28 remains illuminated at the end of implementation of the second order of illumination. The corresponding light source(s) 30 thus remains illuminated until the delay marking the end of the sequence S2.

Also, the control device 50 is adapted to control the first and second sets 28, 32 of the light sources 30, 34 in a third sequence S3 during which:
all or some of the light sources 30 of the first set 28 are illuminated sequentially in a third predefined order of illumination, then kept illuminated, and
all or some of the light sources 34 of the second set 32 are illuminated after the illumination of the light sources 30 of the first set 28, in the third order of illumination.

For example, this sequence S3 follows the same temporal structure as sequence S1, i.e. it is implemented for a duration of 0.33 s and is then followed by a delay of 0.33 s.

The effect of this sequence S3 is to further increase the light power of the light beam emitted by the system 2.

For example, the third order of illumination corresponds to the first order of illumination.

Figure 5:
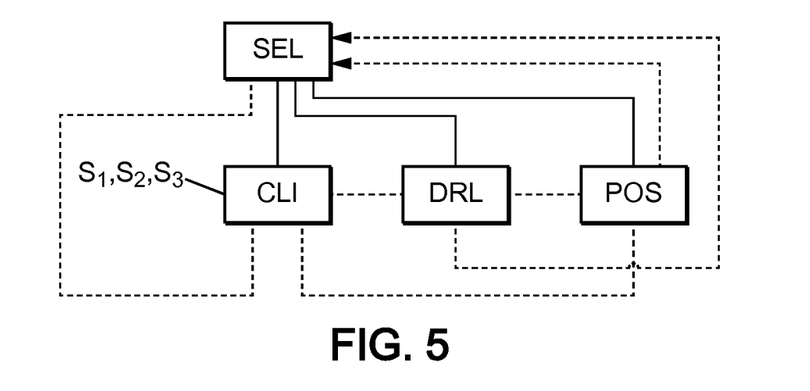
FIG. 5 illustrates a method of use of the optical system of FIGS. 1 to 3.

An operating method of the system 2 will now be described with reference to FIG. 5.

Initially, for example on start-up of the vehicle comprising the system 2, during a selection step SEL the control device 50 determines whether an operating mode of the system 2 should be implemented, and if so, which one. This determination is performed for example as a function of detecting the actuation of a control actuated by the driver and affecting the system 2, or from information supplied by another vehicle system such as information on the activation of the low beam lights of the vehicle.

The control concerned is for example a position lighting control, or a direction change indicator control which affects the system 2. Note that in such a case, the system 2 is associated with only one of the directions in which the vehicle may change direction, such that actuation of the control concerned may not affect the system 2. This control for example takes the form of a lever on the steering column which the driver moves in a given direction, in order to signify his intention to change the direction of the vehicle, in a direction associated with the direction of movement of the lever.

Alternatively, the control triggering the implementation of one or more operating modes of the system 2 may take any form, such as a pushbutton.

In response to this detection, the control module 50 activates the corresponding operating mode of the system 2.

For example, during a step CLI, the system 2 operates in a first operating mode in which it performs a function of flashing lighting.

During this step, the control module 50 controls the first and second sets 28, 32 of light sources 30, 34 in one or more sequences S1 to S3 successively.

In parallel, the control module 50 controls the illumination of all or some of the light sources 48 of the third set 46.

During this step CLI, the light sources 30 of the first set 28 radiate substantially through the light guide 36. The effect of this passage through the light guide 36 is to homogenize the light emitted by the first subsystem 6 such that the light beam emitted by the system 2 is more homogenous.

On detection of actuation of a control or information associated with the triggering of the second operating mode, the control module 50 controls the implementation of the second operating mode of daytime running lighting.

During a subsequent step DRL, one or more of the light sources 34 of the second assembly 32 able to emit a white light beam are illuminated and radiate with the first light power. The light thus emitted propagates along the light guide 36 and is then diverted by the diversion means 42 such that the beams emitted by the white light sources are visible in the emission direction X.

On detection of actuation of a control or information associated with the triggering of the third operating mode, the control module 50 controls the implementation of the third operating mode.

During a subsequent step POS, one or more of the light sources 34B of the second set of light sources able to emit white-colored light are illuminated to emit a beam with a second light intensity lower than the first light intensity. This is obtained for example by supplying the light sources 34B with a second electrical power lower than the first electrical power.

On detection of the actuation of a control, in the absence of detection of a control associated with at least one of the operating modes, or on information associated with the extinction of system 2, the control module 50 again proceeds with the selection step SEL.

It is noted that preferably only the amber-colored light sources 34A emit in the first operating mode, and only the white light sources 34B are illuminated in the second operating mode.

Other operating modes are conceivable.

In particular, in certain embodiments, the system 2 may comprise diffusion means for the light emitted by the first set 28 of light sources 30 towards the light guide 36. These diffusion means comprise for example collimators or reflectors.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical light emission system for a motor vehicle, said optical light emission system comprising:
   a first light emission subsystem comprising a first set of light sources configured to emit light; and
   a second light emission subsystem comprising a second set of light sources configured to emit light and a light guide able to diffuse said light from said second set of said light sources outside said optical light emission system;

wherein said light guide is arranged facing said first set of said light sources such that said first set of said light sources radiates substantially through said light guide outside said optical light emission system;

wherein said light guide has two longitudinal end faces separated by at least one peripheral face, one of said two longitudinal end faces forming a light entry face associated with said second set of said light sources, said light emitted by said second set propagating by total internal reflection in said light guide up to a light outlet face of said light guide arranged on said at least one peripheral face and being emitted through said light outlet face;

wherein said second light emission subsystem is arranged such that when said light sources of said second set emit light, a beam emitted via said light outlet face of said light guide performs a legally required function of direction indication;

wherein said first light emission subsystem is adapted to perform a subfunction of said direction indication function, said subfunction being known as a tracer function and consisting of sequential illumination of a plurality of light sources taking place over an interval of predefined duration.

2. The optical light emission system according to claim 1, wherein said first set of said light sources extends facing said light guide substantially along said at least one peripheral face of said light guide, from a side of said light guide opposite said light outlet face, said second set of said light sources being arranged at said light entry face.

3. The optical light emission system according to claim 1, wherein said light guide comprises diversion means, said diversion means comprising diversion prisms, formed on a surface of said light guide or in a thickness of said light guide.

4. The optical light emission system according to claim 1, comprising a housing delimiting an open cavity, said housing comprising a portion on which said first set of said light sources is arranged such that said first set of said light sources is situated facing an opening of said open cavity.

5. The optical light emission system according to claim 4, wherein said optical light emission system also comprises a closing diffusing lens sealing said open cavity.

6. The optical light emission system according to claim 1, wherein said optical light emission system also comprises at least one light source offset relative to said light guide such that said at least one light source does not radiate substantially through said light guide.

7. The optical light emission system according to claim 1, wherein said optical light emission system also comprises a control device for said first set and said second set of said light sources.

8. The optical light emission system according to claim 7, wherein said control device is adapted to control said first set and said second set of said light sources in a second sequence (S2) in which:
all or some of said light sources of said first set are illuminated sequentially in a second predefined order of illumination,
the light power emitted by all or some of said light sources of said first set is reduced after the illumination of said light sources of said first set, in said second predefined order of illumination, and
all or some of said light sources of said second set are illuminated after the illumination of said light sources of said first set, in said second predefined order of illumination.

9. The optical light emission system according to claim 7, wherein said control device is adapted to control said first set and said second set of said light sources in a third sequence (S3) in which:
all or some of said light sources of said first set are illuminated sequentially in a third predefined order of illumination, and
all or some of said light sources of said second set are illuminated after the illumination of said light sources of said first set, in said third predefined order of illumination.

10. The optical light emission system according to claim 1, wherein said second set of said light sources of said second light emission subsystem comprises one or more light sources able to emit white-colored light.

11. The optical light emission system according to claim 10, wherein said optical light emission system has a first operating mode in which said optical light emission system performs the function of flashing lighting, and a second operating mode of daytime running lighting in which one or more of said light sources of said second set of said light sources able to emit white-colored light are illuminated.

12. The optical light emission system according to claim 10, wherein light guide comprises diversion means configured to modify a direction of propagation of said light emitted by said second set of said light sources which propagates along said light guide.

13. The optical light emission system according to claim 1, wherein light guide comprises diversion means configured to modify a direction of propagation of said light emitted by said second set of said light sources which propagates along said light guide.

14. An optical light emission system for a motor vehicle, said optical light emission system comprising:
a first light emission subsystem comprising a first set of light sources configured to emit light; and
a second light emission subsystem comprising a second set of light sources configured to emit light and a light guide able to diffuse said light from said second set of said light sources outside said optical light emission system;
wherein said light guide is arranged facing said first set of said light sources such that said first set of said light sources radiates substantially through said light guide outside said optical light emission system;
wherein said optical light emission system also comprises a control device for said first set and said second set of said light sources;
wherein said control device is adapted to control said first set and said second set of said light sources in a first sequence (S1) in which all or some of said light sources of said first set are illuminated sequentially in a first predefined order of illumination and then extinguished simultaneously and all or some of said light sources of said second set are illuminated in response to said simultaneous extinction of said light sources of said first set.

15. The optical light emission system according to claim 14, wherein said light guide has two longitudinal end faces separated by at least one peripheral face, one of said two longitudinal end faces forming a light entry face associated with said second set of said light sources, said light emitted by said second set propagating by total internal reflection in said light guide up to a light outlet face of said light guide arranged on said at least one peripheral face and being emitted through said light outlet face.

16. The optical light emission system according to claim 15, comprising a housing delimiting an open cavity, said housing comprising a portion on which said first set of said light sources is arranged such that said first set of said light sources is situated facing an opening of said open cavity.

17. The optical light emission system according to claim 15, wherein said optical light emission system also comprises at least one light source offset relative to said light guide such that said at least one light source does not radiate substantially through said light guide.

18. The optical light emission system according to claim 15, wherein said optical light emission system also comprises a control device for said first set and said second set of said light sources.

19. The optical light emission system according to claim 15, wherein said second set of said light sources of said second light emission subsystem comprises one or more light sources able to emit white-colored light.

20. The optical light emission system according to claim 14, wherein said second light emission subsystem is arranged such that when said light sources of said second set emit light, a beam emitted via a light outlet face of said light guide performs a legally required function of direction indication.

21. The optical light emission system according to claim 20, wherein said first set of said light sources is configured to emit light in a main emission direction (X), a diversion means being configured to re-orient said light emitted by said second set of light sources which propagates along said light guide substantially in said main emission direction (X).

22. An optical light emission system for a motor vehicle, said optical light emission system comprising:

a first light emission subsystem comprising a first set of light sources configured to emit light; and a second light emission subsystem comprising a second set of light sources configured to emit light and a light guide able to diffuse said light from said second set of said light sources outside said optical light emission system;

wherein said light guide is arranged facing said first set of said light sources such that said first set of said light sources radiates substantially through said light guide outside said optical light emission system;

wherein said second set of said light sources of said second light emission subsystem comprises one or more light sources able to emit white-colored light;

wherein said optical light emission subsystem has a first operating mode in which said optical light emission system performs the function of flashing lighting, and a second operating mode of daytime running lighting in which one or more of said light sources of said second set of said light sources able to emit white-colored light are illuminated;

wherein during said second operating mode, one or more of said light sources of said second set of said light sources able to emit white-colored light are illuminated to emit a beam with a first light intensity when supplied with a first electrical power, said optical light emission system comprising a third operating mode of position lighting, in which one or more of said light sources of said second set of said light sources able to emit white-colored light are illuminated to emit a beam with a second light intensity lower than said first light intensity when supplied with a second electrical power lower than said first electrical power.

* * * * *